June 13, 1967 — J. E. MARKLEY — 3,324,574

FRAMED BLACK SILHOUETTE

Filed March 30, 1965 — 2 Sheets-Sheet 1

INVENTOR
J. E. MARKLEY
BY
ATTORNEY

June 13, 1967  J. E. MARKLEY  3,324,574
FRAMED BLACK SILHOUETTE
Filed March 30, 1965  2 Sheets-Sheet 2

INVENTOR
J. E. MARKLEY
BY
ATTORNEY 3,324,574
FRAMED BLACK SILHOUETTE
James Eldon Markley, 3605 W. 9th St.,
Topeka, Kans. 66606
Filed Mar. 30, 1965, Ser. No. 443,954
1 Claim. (Cl. 35—26)

This invention relates to a silhouette and method for making same. More particularly, this invention relates to a method for making a silhouette by using as the silhouette material a foamed thermoplastic material which is mounted on a mat having a contrasting color from the surface of the silhouette.

The art of producing silhouettes goes back a great many years. Usually, the prior art silhouettes are of thin black paper. Unfortunately, the silhouettes produced from such materials do not readily give a bas-relief effect, i.e., tending to show a third dimension of the object. In other words, the prior art silhouettes are merely shadows of the animate object which they are said to portray.

Accordingly, it is a primary object of the present invention to disclose a method for producing an ingenious silhouette.

It is another object of the present invention to disclose a method for producing a silhouette from foamed thermoplastic materials.

It is another object of the present invention to disclose a bas-relief produced from foamed thermoplastic materials.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not limitation.

Figure 1:
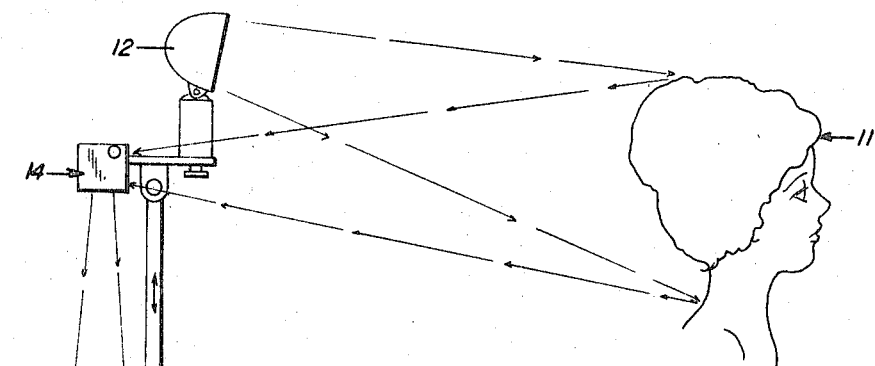
FIG. 1 is a side view of the system of the present invention.
Figure 3:
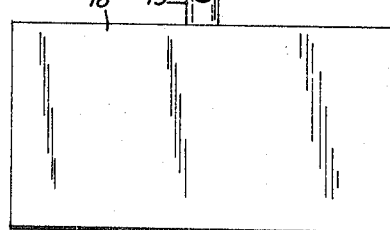
FIG. 3 is a top plan view of the work surface utilized in producing the silhouette of the present invention.
Figure 4:
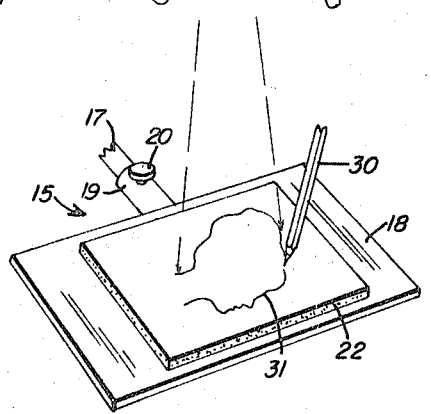
FIG. 4 is a top perspective view showing a part of the work surface and the concept of producing the silhouette of the present invention.

Now, turning to FIG. 1 the general concept can be seen therefrom wherein an animate object 11 is a head of a woman. The head is suitably illuminated by means of a floodlight 12 mounted on the upper portion of a tripod 13 having a usual configuration as seen in the set-up position of FIG. 1. Positioned near the floodlight is an image producing device 14. A work supporting device 15 is provided directly below the image producing device 14. From FIG. 3 one can see the work supporting device comprising a C-clamp 16 which encompasses one of the legs 13A of the tripod. Extending from the C-clamp 16 is an elongated rod 17 on which is mounted a shelf 18 which may be moved towards the C-clamp 16 and away therefrom inasmuch as rod 17 is slidably disposed in tubular member 19 which is secured to the underside of the shelf 18. A thumb screw 20 is utilized in adjusting and tightening the shelf 18 to a suitable position on 17. Returning to FIG. 1 it will be seen that the shelf 18 is positioned horizontally on the tripod.

Figure 2:
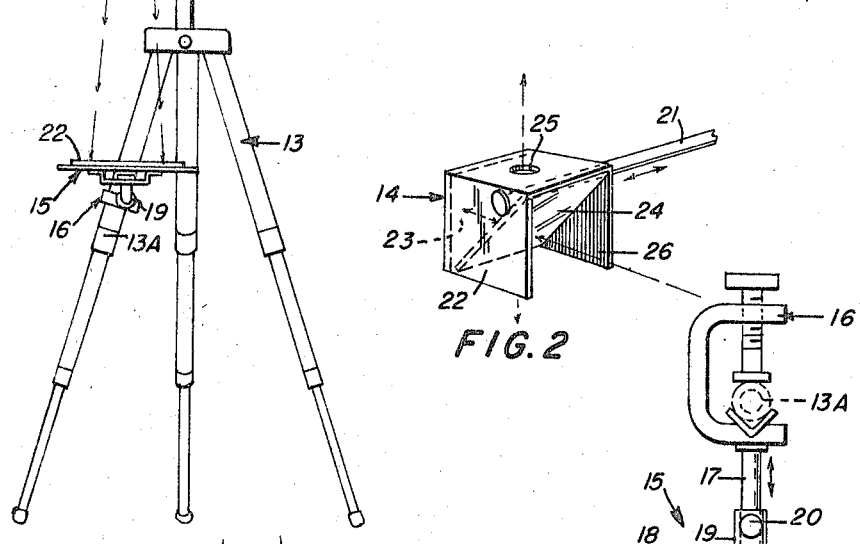
FIG. 2 is a perspective view of the ingenious image producing device of the present invention.

From FIG. 2 one can see with greater clarity the concept of the image producing device 14. This device is secured to the tripod by means of rod 21 and is positioned to reflect the image of the animate object 11 and produce a visual impression of the image on shelf 18 on a sheet 22 of foamed thermoplastic material. The sheet 22 is Styrofoam having on the surface thereof a black laminate coating.

Returning once again to the ingenious image-producing device 14, it will be noted that the device has a box-like shape 22, but does not have a bottom and lacks a side on one side. At one side 23 a mirror is mounted to reflect inwardly. A plain sheet of glass 24 is at a 45° angle. At the upper surface and centrally disposed of the device is a view opening 25. In utilizing the device 14 the open end 26 is directed towards the animate object 11 as shown in FIGURE 1. One need merely look through the view opening 25 in order to accomplish the desired results. In other words, the mirror 23 will pick up the rays of light reflected from the animate object 11 which have passed through the glass 24 to the mirror surface 23 and then will again strike glass 24 but will do so at the surface thereof giving a modicum of reflection upwardly through opening 25. By adjusting the eye for a lengthy focus, it is possible to visualize the animate object 11 produced thereby in reduced condition by means of a white pencil 30.

Figure 5:
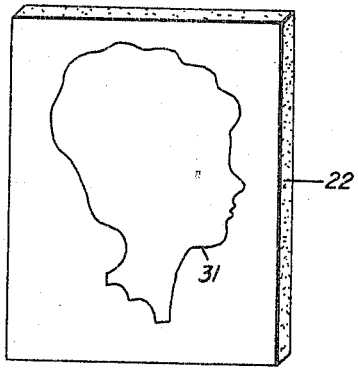
FIG. 5 is the thermoplastic material utilized in the present invention having drawn thereon an outline of the silhouette.

Once the outline has been achieved the result can be seen in FIGURE 5 which is the thermoplastic material 22 having a black surface and an outline thereon in white pencil, shown by reference numeral 31, the silhouette of the animate object 11.

Figure 6:
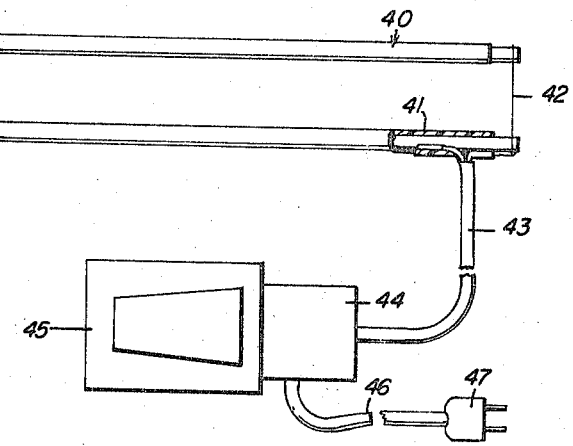
FIG. 6 is the tool employed in cutting the silhouette.

In order to complete the production of the product of the present invention it is now necessary to cut out the silhouette along the white line 31 on the black surface of the foamed thermoplastic material 22. This is accomplished by a unique cutting tool shown in FIGURE 6. It will be noted that the cutting tool comprises an elongated U-shaped element 40 having insulation over the metal portions shown at reference numeral 41. A resistance wire 42 connects the legs of the U-shaped element 40. Electric current is carried to both ends of the resistance wire 42 by means of line 43 which is suitably energized through a transformer 44 and is set into operation by a conventional foot switch 45. A line 46 leads to a male plug 47 for connection in a conventional wall outlet (not shown). In operation the foot switch 45 is depressed, energizing the resistance wire 42 so that it becomes suitably heated to melt a path into the foamed thermoplastic material 22 and then by suitable operation the resistance wire 42 will be utilized to cut by means of melting the silhouette produced on the foamed thermoplastic material 22. The white outline penciled on the black surface is followed.

Figure 7:
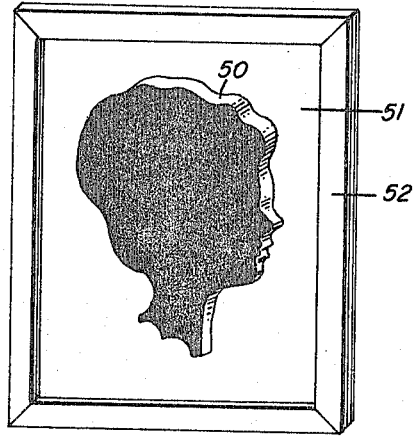
FIG. 7 is a front view of the finished product of the present invention.

Once this has been accomplished the silhouette shown in FIGURE 7 by reference numeral 50 is mounted on a mat surface 51. Preferably the mat surface is of a high contrast to the black surface of the silhouette 50. The mat with the mounted silhouette adhesively secured thereto or by some other suitable means is then secured in a frame 52 in a usual manner. The resultant may be hung on a wall or a tripod of conventional arrangement may be secured thereto so that the mounted bas-relief produced by the instant invention may be suitably displayed.

It will be apparent that many changes and modifications of the several features described herein may be made without departing from the spirit and scope of the invention. It is therefore apparent that the foregoing description is by way of illustration of the invention rather than limitation of the invention.

What is claimed is:

A pronounced bas-relief article of an object comprising:

(a) a first substrate;
(b) a second substrate of pronounced 3-dimensional character fabricated of a foamed white thermoplastic material mounted on said first substrate;
(c) said second foamed white thermoplastic substrate having one face covered with a black laminate coating contrasting in color to that of said second substrate;
(d) said thermoplastic substrate being cut to an outline of an object, whereby when said second substrate is mounted on said first substrate a pronounced 3-dimensional base-relief silhouetted article is achieved; and
(e) said first substrate being mounted in a frame.

References Cited
UNITED STATES PATENTS

| | | | |
|---|---|---|---|
| 2,079,508 | 5/1937 | Kaplowitz | 35—26 |
| 2,554,408 | 5/1951 | Hile | 40—142 |
| 2,592,078 | 4/1952 | Taylor | 35—28 X |
| 2,618,901 | 11/1952 | Braun. | |

EUGENE R. CAPOZIO, *Primary Examiner.*

H. S. SKOGQUIST, *Asistant Examiner.*